2,783,291
LIQUID-FILLING DEVICE

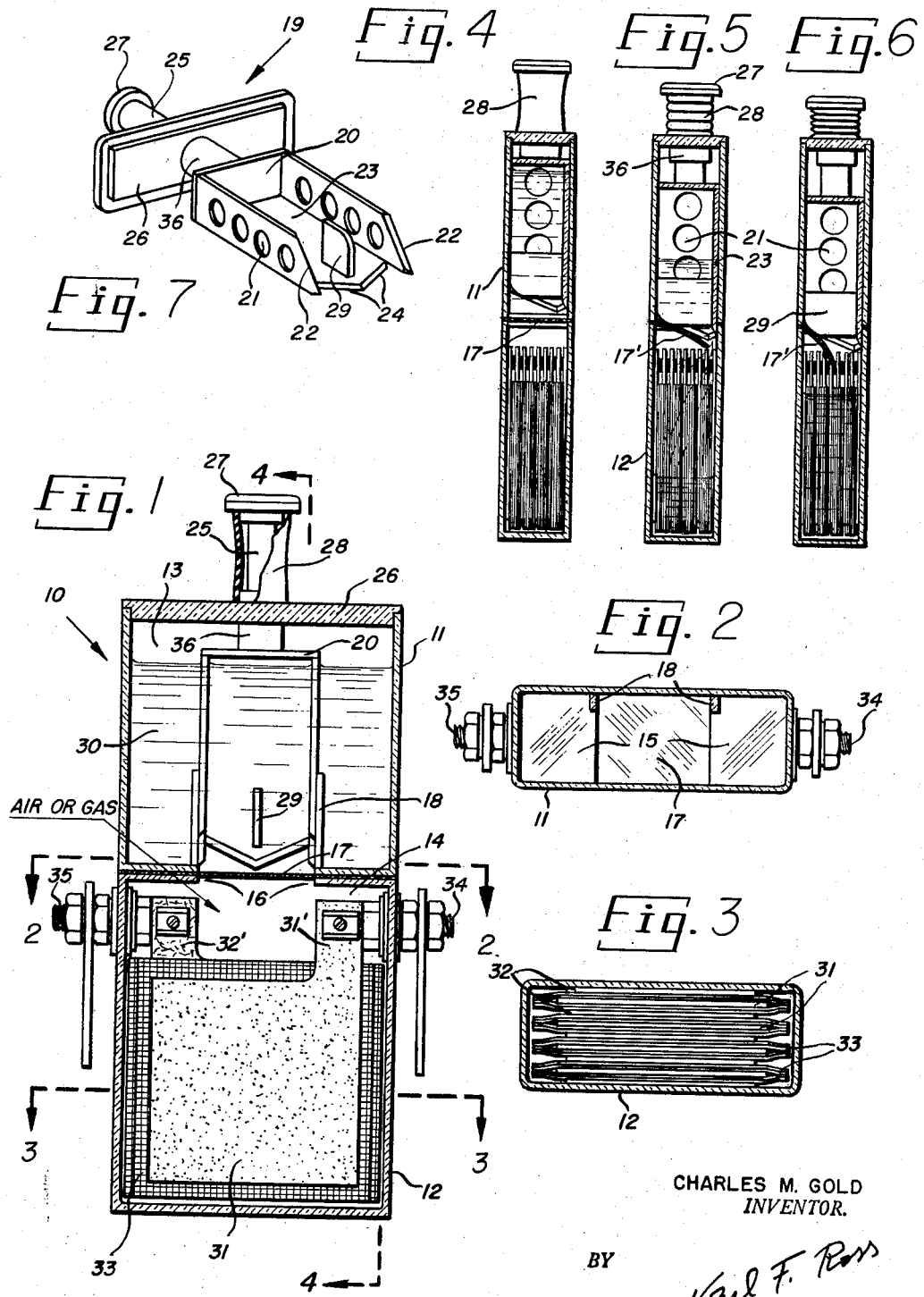
Feb. 26, 1957 — C. M. GOLD — 2,783,291
LIQUID-FILLING DEVICE
Filed Oct. 18, 1952
CHARLES M. GOLD
INVENTOR.
BY Karl F. Ross
AGENT United States Patent Office 2,783,291
Patented Feb. 26, 1957

Charles M. Gold, Rego Park, N. Y., assignor, by mesne assignments, to Yardney International Corp., New York, N. Y., a corporation of New York Application October 18, 1952, Serial No. 315,508

15 Claims. (Cl. 136—90)

My invention relates to electric batteries, more particularly to batteries of the deferred-action type that are charged in the dry state and are subsequently activated by the introduction of liquid electrolyte into the casing containing the electrode assembly.

Batteries of this description have been found useful under conditions requiring prolonged storage in a charged state, inasmuch as the absence of electrolyte during storage will effectively prevent any premature loss of charge and will also protect the inter-electrode separators from chemical attack and consequent early deterioration. While such batteries can be used without preliminary on-the-spot charging, a certain delay is always necessary to allow for the activation of the battery, i. e. the permeation of the electrode assembly by the electrolyte.

It is an object of my present invention to provide means for activating a dry-charged battery in such manner as to reduce to a minimum the time required for such activation.

It is another object of this invention to provide means for so storing an electrolyte adjacent an electrode assembly as to provide a self-contained, leakproof unit in which the liquid is securely prevented from making contact with the electrode assembly until it is given access thereto by the operation of an activating mechanism.

A further object of my invention, allied with the preceding one, is to provide an activating mechanism which, while admitting liquid to the electrode assembly and allowing for the displacement of air by said liquid, will not affect the leakproofness of the unit containing the electrode assembly.

In accordance with the invention I provide a casing having two compartments or chambers, one compartment containing an electrode assembly (with the electrodes preferably in the charged state), the other compartment containing sufficient liquid to enable adequate irrigation and permeation of the electrode assembly upon removal of the separation between the two compartments. This separation, according to a feature of my invention, is provided by virtue of a liquid-impenetrable but frangible membrane initially present between the compartments and adapted to be pierced by a special activating device. Piercing of the membrane thereupon allows the liquid from the first compartment to enter, preferably by gravity, the second compartment and to drive the air from the latter back into the first compartment, thereby effecting an interchange of air and liquid. I have found that by cutting a single, relatively large opening into the membrane, i. e. an opening whose cross section is of the order of a major fraction of the cross section of the compartment initially containing the liquid, a complete interchange of the fluids and full activation of the battery can be accomplished in a matter of seconds. It may be mentioned that the air originally present in the compartment containing the electrode assembly may also be replaced by an inert, protective gas such as, for example, nitrogen, argon or helium.

The above and other objects and features of the invention will become more fully apparent from the following description of a now preferred embodiment, reference being had to the accompanying drawing in which:

Fig. 1 is a sectional elevational view of a self-contained unit according to the invention, with a liquid-containing compartment overlying a compartment which contains an electrode assembly;

Fig. 2 is a cross section through the upper compartment, taken on the line 2—2 of Fig. 1;

Fig. 3 is a cross section through the lower compartment, taken on the line 3—3 of Fig. 1;

Fig. 4 is a section taken on the line 4—4 of Fig. 1, showing the unit in storage condition preparatory to activation;

Fig. 5 is a view similar to Fig. 4, showing the unit in the process of activation;

Fig. 6 is a view similar to Figs. 4 and 5, showing the unit upon completion of the activation; and Fig. 7 is a perspective view of the activating device.

The unit 10, Fig. 1, consists essentially of two sub-units 11 and 12 positioned one on top of the other, each of these units comprising a shell enclosing a respective chamber or compartment 13, 14. The upper compartment 13 is separated from the lower compartment 14 by a partition 15 having a central aperture 16 of rectangular configuration, the size of this aperture being roughly between one third and one half of the cross section of each compartment along their common boundary. The aperture 16 is initially closed by an impermeable membrane 17 consisting, for example, of polyethylene or polystyrene.

The upper compartment 13 is provided with a pair of vertical strips 18 forming guide rails for an actuating member 19. This member, as best shown in Fig. 7, comprises a bracket 20 of inverted U-shape whose side arms are apertured, as at 21, and are provided with beveled, inclined knife edges 22 at their lower ends; it further comprises a back plate 23, spanning the arms of bracket 20, likewise provided at its lower end with beveled, inclined knife edges 24, the lowest tips of all of these edges 22, 24 lying substantially in one horizontal plane so as to pierce the membrane simultaneously, at three points, upon lowering of the member 19 between its guide rails 18. Such lowering is made possible by the provision of a stem 25 which rises from the bracket 20 and passes through the fixed lid 26 of the upper sub-unit 11 by way of a short tube 36 traversing said lid; the stem 25 carries a knob 27 from which a rubber sleeve 28 (Figs. 1 and 4) extends toward the lid 26 in such manner as to form a fluid-tight seal about the tube 36; this rubber sleeve may itself be sufficiently rigid to tend to maintain the member 19 in its normal, raised position as shown in Figs. 1 and 4 although, if desired, this action may be supported by means of, say, a spring (not shown) surrounding the stem 25 within the sleeve 28. A projection 29, extending forwardly from the lower end of plate 23, serves to depress the flap 17' cut from the membrane 17 by the edges 22, 24, as best seen in Figs. 5 and 6. The electrolyte initially present in compartment 13 is shown at 30.

The lower compartment 14 contains an electrode assembly comprising positive electrodes 31 alternating with negative electrodes 32, adjacent electrodes being separated from one another by spacers 33 of, preferably, sufficient porosity to enable substantially instantaneous penetration by the electrolyte 30 upon a piercing of the membrane 17. Thus the spacers 33 may each comprise one or more layers of, for example, absorbent paper; the electrodes 31 and 32 may consist, for example, of silver peroxide and of zinc, repectively, in which case the electrolyte 30 may be an alkaline solution such as potassium hydroxide with or without an appreciable initial concentration of potassium zincate. Lugs 31' and 32' extend from the several electrodes and are connected to a negative terminal screw 34 and a positive terminal screw 35, respectively.

From the foregoing description and particularly from the illustration given in Figs. 4–6 it will be apparent that, when the knob 27 is depressed, the knife edges 22, 24 of the chute-like actuating member 19 will cut a U-shaped slit into the membrane 17 in such manner as to sever the flap 17' from the body of the membrane along three sides of the aperture 16, whereby this flap is enabled to be bent downward, along a line extending close to the fourth side of aperture 16, by the weight of the liquid 30 and by the pressure of projection 29. The hole thus formed in the membrane 17 is substantially coextensive with the aperture 16 and is large enough to permit a rush of electrolyte into the lower compartment 14, by way of the apertures 21, as well as the simultaneous escape of air or gas from the latter compartment into the upper chamber 13. At least part of the inrushing liquid is immediately absorbed by the permeable spacers 33 and thus completes the galvanic circuit between terminals 34 and 35 by way of positive and negative electrodes 31 and 32. Activation of the battery, accordingly, occurs in effect by virtue of an interchange of positions between the gaseous fluid (e. g. air) in chamber 14 and the liquid electrolyte in chamber 13.

It should further be observed that the arrangement herein disclosed operates to produce an opening in a membrane by partially severing a portion thereof from the remainder of the membrane and deflecting the partially severed portion, whereby an opening for the passage of fluid is created, but that the remaining connection between said portion and the rest of the membrane will prevent such portion from lodging anywhere in the lower compartment so as to contaminate the contents of the latter and/or to obstruct the flow of liquid therein.

While the invention has been described with particular reference to a battery, it should be understood that it may find application in other filling systems and that, accordingly, the specific arrangement shown in the drawing may be modified or adapted in various ways without, thereby, departing from the spirit and scope of the invention as defined in the claims. Thus it may be mentioned that the configuration of the perforating member 19, whose edges in the embodiment illustrated are arranged along three sides of a rectangle, may be modified to comprise, for example, a pair of edges defining the sides of a triangle, a single edge curved in an arc, or any other arrangement adapted to result in the partial severance of a flap-like portion such as 17' from a membrane such as 17.

I claim:

1. A device for admitting liquid from a first compartment into a second compartment originally separated from said first compartment, comprising partition means between said compartments including a frangible membrane, a perforating member displaceable toward said membrane and having at least one edge adapted to cut a flap-like portion from said membrane while leaving one side of said portion connected with the remainder of said membrane, pusher means on said member so positioned adjacent said edge as to deflect said portion with respect to said remainder, thereby forming a hole in said membrane for the passage of liquid from said first compartment into said second compartment, and operating means for displacing said perforating member.

2. A device for admitting liquid from an upper compartment into a lower compartment originally separated from said upper compartment, comprising partition means between said compartments including a substantially horizontal, frangible membrane, said partition means supporting said liquid in said upper compartment, a membrane-piercing member poised above said membrane in said upper compartment, said member being provided with an at least roughly U-shaped, knife-edged lower extremity encompassing a space filled with said liquid, said space having a cross-section corresponding to at least a major fraction of the cross section of said upper compartment at said partition means, and means for displacing said member toward said membrane.

3. In an electric battery of the deferred-action type, in combination, a casing subdivided into an upper and a lower compartment, a substantially horizontal partition between said compartments having a relatively rigid portion provided with a window and a frangible, membrane-type portion secured to said rigid portion and spanning said window, a liquid electrolyte in said upper compartment supported by said partition, an electrode assembly in said lower compartment, a membrane-piercing member poised above said window in said upper compartment, said member having a lower extremity provided with knife edge portions partly encircling an area slightly smaller than said window, thereby partially severing a flap-shaped portion from said membrane upon a piercing of the latter by said extremity, and means for displacing said member toward said membrane.

4. In an electric battery of the deferred-action type, in combination, a casing subdivided into a first and a second compartment, an electrode assembly in said first compartment, partition means including a frangible membrane separating said compartments from each other, a liquid electrolyte in said second compartment originally prevented by said membrane from entering said first compartment, and activating means for said battery including mechanism for positively forming a sufficiently large unobstructed passage through said membrane to enable said liquid to rapidly and completely enter said first compartment and to force a corresponding quantity of a gaseous fluid from said first compartment into said second compartment, said mechanism comprising an operating member projecting through said casing and flexible means positioned externally of said casing and forming a fluid-tight seal about said operating member.

5. In an electric battery of the deferred-action type, in combination, a casing having a partition subdividing said casing into an upper and a lower compartment, said partition including a substantially horizontal, fragible membrane, an assembly of charged electrodes in said lower compartment, a liquid electrolyte in said upper compartment, mechanism in said casing for piercing said membrane and partially severing therefrom a portion, thereby enabling said electrolyte to enter said lower compartment and, thus, to activate the battery, and means for operating said mechanism, said operating means comprising a stem traversing said casing and provided with flexible sheath means, externally of said casing, forming a fluid-tight seal about said stem, said mechanism comprising a knife member positioned inside said upper compartment and resilient means including said flexible sheath means tending to maintain said knife member suspended above said membrane, said knife member having the form of a three-sided chute with cutting edges at its ends so positioned as to form a substantially U-shaped cut in said membrane.

6. In an electric battery of the deferred-action type, in combination, a casing having a partition subdividing said casing into an upper and a lower compartment, said partition including a substantially horizontal, frangible membrane, an assembly of charged electrodes in said lower compartment, a liquid electrolyte in said upper compartment, mechanism in said casing for piercing said membrane and partially severing therefrom a portion, thereby enabling said electrolyte to enter said lower compartment and, thus, to activate the battery, and means for operating said mechanism, said mechanism comprising a knife member aligned with said membrane and operating means for advancing said knife member toward said membrane, said knife member having the form of a three-sided chute with cutting edges at its ends so positioned as to form a substantially U-shaped cut in said membrane.

7. In an electric battery of the deferred-action type, in combination, a casing subdivided into an upper and a lower compartment, a substantially horizontal partition between said compartments having a relatively rigid portion provided with a window and a frangible, membrane-type portion secured to said rigid portion and spanning said window, a liquid electrolyte in said upper compartment, a membrane-piercing member poised above said window in said upper compartment, said member having a lower extremity provided with knife edge portions partly encircling an area slightly smaller than said window, thereby partially severing a flap-shaped portion from said membrane upon a piercing of the latter by said extremity, and means for displacing said member toward said membrane, said upper compartment being of rectangular cross-section, said member comprising two side walls and a back wall defining a chute of rectangular cross-section, the width of said chute being substantially equal to that of said upper compartment, said window extending completely across the width of said partition.

8. An electric battery of the deferred action type comprising a casing having a partition subdividing said casing into a first and a second compartment, said partition including a frangible membrane, an assembly of electrodes in said first compartment, said second compartment containing electrolyte, and mechanism for severing a tongue-shaped portion in said membrane thereby forming a passage through said membrane and for holding said portion in a position not obstructing the electrolyte transfer from said first to said second compartment.

9. An electric battery as defined by claim 8 in which the tongue-shaped portion extends substantially across at least one dimension of the first compartment.

10. An electric battery as defined by claim 8 in which the passage has a cross-sectional area equal to at least a major portion of the cross-sectional area of the partition.

11. An electric battery as defined by claim 8 in which the mechanism comprises a U-shaped knife member defining the area of the tongue-shaped portion, and operating means for advancing the knife member through said membrane.

12. An electric battery as defined in claim 11 in which the knife member is provided with an element adapted to displace the severed tongue-shaped portion.

13. A device for admitting liquid from an upper compartment into a lower compartment separated therefrom by a partition comprising a substantially horizontally frangible membrane, a movable membrane piercing member, held poised at a distance from said membrane and aligned therewith, in said upper compartment, having knife edges bounding all but one lateral side of a vertically columnar space which has a cross section equal to at least a major part of the maximum cross section of the upper compartment, both said cross sections being measured in a plane parallel to the surface of the frangible membrane.

14. An electric battery of the deferred action type comprising a casing subdivided into an upper and lower compartment, a substantially horizontal partition between said compartments having a relatively rigid portion provided with a window and a frangible membrane secured to said rigid portion and spanning said window, a liquid electrolyte in said upper compartment supported by said partition and said membrane, an electrode assembly in said lower compartment, a membrane-piercing member held poised above said window in said upper compartment, said member having a lower extremity provided with knife edge portions partly encircling an area which, measured in a plane parallel to said window and slightly thereabove, is larger than the cross-sectional area of said member measured in said plane and smaller than the cross section area of said window, and said member positively forming, upon a piercing of the said membrane by said member, a tongue of said membrane material which is attached to the remainder of said membrane only along one edge of said tongue and, between said upper and said lower compartments, a passage through said window, of a cross sectional area several times the cross sectional area of the portions of said member which are displaced through said membrane.

15. The combination according to claim 14, wherein said upper compartment is of rectangular cross section, said membrane piercing member comprising two foraminous side walls and a back wall defining a chute of rectangular cross section, the width of said chute being substantially equal to that of said upper compartment, said window extending completely across the width of said partition.

References Cited in the file of this patent

UNITED STATES PATENTS

| | | |
|---|---|---|
| 1,218,847 | Firey | Mar. 13, 1917 |
| 2,441,896 | Moir | May 18, 1948 |
| 2,500,169 | Ellis | Mar. 14, 1950 |
| 2,502,723 | Harriss | Apr. 4, 1950 |
| 2,594,879 | Davis | Apr. 29, 1952 |

FOREIGN PATENTS

| | | |
|---|---|---|
| 563,323 | Great Britain | Aug. 9, 1944 |